United States Patent [19]

Kennedy

[11] Patent Number: 4,848,845

[45] **Date of Patent: * Jul. 18, 1989**

[54] STEERABLE SELF-REGULATING CONCRETE CUTTING SAW

[75] Inventor: Ralph Kennedy, Pataskala, Ohio

[73] Assignee: Ampsco Corporation, Columbus, Ohio

[ * ] Notice: The portion of the term of this patent subsequent to Jun. 7, 2005 has been disclaimed.

[21] Appl. No.: 168,782

[22] Filed: Mar. 16, 1988

[51] Int. Cl.[4] .......................... B28D 1/04; B62D 11/02

[52] U.S. Cl. .................................. 299/39; 51/165.92; 60/426; 125/14; 180/6.48

[58] Field of Search .................... 299/39, 36; 180/6.48; 125/14; 404/83, 90; 51/165.92; 60/426, 430

[56] References Cited

U.S. PATENT DOCUMENTS

| | | | |
|---|---|---|---|
| 2,488,643 | 11/1949 | Smith | 125/14 |
| 3,291,532 | 12/1966 | Hatcher | 299/39 |
| 3,877,180 | 4/1975 | Brecker | 51/165.9 |
| 3,896,700 | 7/1975 | Johnsson et al. | 180/6.48 X |
| 3,975,909 | 8/1976 | McBurnett | 60/421 |
| 4,310,198 | 1/1982 | Destree | 299/39 |
| 4,395,878 | 8/1983 | Morita et al. | 180/6.48 X |
| 4,553,389 | 11/1985 | Tischer et al. | 60/384 |
| 4,748,966 | 6/1988 | Kennedy | 51/165.92 X |

*Primary Examiner*—Jerome W. Massie
*Assistant Examiner*—David J. Bagnell
*Attorney, Agent, or Firm*—John L. Gray

[57] ABSTRACT

A self-propelled concrete cutting saw in which the saw and self-propelled platform associated with the saw are both driven by hydraulic motors, with separate motors for each of the two propelling wheels so that the device may be steered by varying the speed of either of the wheels, with the speed of longitudinal movement of the saw through the concrete being controlled by the density of the concrete being cut by the saw so that the saw blade is operated at an optimum rotational speed.

6 Claims, 2 Drawing Sheets

STEERABLE SELF-REGULATING CONCRETE CUTTING SAW

BACKGROUND OF THE INVENTION

Rotary concrete saws in which the operator walks behind the saw and which are used in construction are very well known. Such self-propelled units usually are provided with the longitudinal propulsion of the unit and the rotation of the saw blade being achieved by belts connected through suitable pulley systems to a prime mover. The propulsion speed of the device and the rotational speed of the saw blade may be manually controlled by the operator. However, these units usually weigh about 1600 pounds and they are not steerable other than by sliding the wheels with handles which extend outwardly on either side of the operator. Since the cutting action of the saw blade tends to produce a drag on that side of the saw, the operator must continuously push the handle that is on the same side of the unit to attempt to keep the saw blade on the chalk line being followed in the cutting operation. With a 1600 pound unit, this is very difficult to control since the wheel positions are fixed and in the field one may observe that these handles have been heavily padded by the operator to protect his hips from being bruised by continuously pushing the handles to maintain the saw blade cutting in a straight line.

Furthermore, concrete will vary in density depending upon the ingredients used in making the concrete mix and in large area installations such as highways, airport runways, warehouse floors, etc., the density of the concrete can vary considerably from one pour to another.

In addition, in operating a concrete saw, especially in high way repair work oftentimes the saw blade will encounter reinforcing bars which must also be cut through and, of course, are far denser than concrete. In cutting through concrete, it is desirable to have the surface speed of the blade maintained at an optimum amount. The speed will vary from 9000 to 12,000 feet per minute, depending upon the diameter of the blade and the aggregate being cut.

Concrete blades used for this purpose have diamond cutting edges and are very expensive, costing about $1,200. If the blade is operated at other than optimum speed the cutting edge will wear down at a much more rapid rate, thus dramatically increasing the cost of operation.

In the devices of the prior art the surface speed of the blade and the transfer speed of the saw platform are manually controlled by the operator so that when varying densities of the material being cut are encountered, the judgment of the operator is relied upon to slow the transverse movement of the sw plateform or to modify the speed of the blade, or both, and, of course, the manner in which this is done will vary from operator to operator, depending upon their experience.

In applicant's copending patent application assigned to a common assignee, U.S. Pat. No. 4,748,966 "Self-Regulating Concrete Cutting Saw", there is disclosed an automatic feedback system for a concrete cutting saw which will vary the speed of propulsion of the platform supporting the saw, depending upon the density of the concrete being cut. Two versions of concrete cutting saws are disclosed in this patent application. One is a riding unit having two traction wheels that are driven by the same hydraulic motor and a third wheel which is used to manually steer the unit. Also disclosed is a conventional concrete cutting saw which embodies the same system of varying the speed of propulsion of the unit, depending upon the density of the concrete encounterd by the rotating saw blade, and which is steered by handles in the conventional manner described above.

SUMMRY OF THE INVENTION

This invention concerns a self-propelled saw blade in which the opertor walks behind the unit and in which the propelling wheels are independently driven by separate motors, each of which may be controlled by the operator. While the wheels cannot be turned, by having them rotate at different speeds the operator is able effectively to steer the unit and thus enable the operator with minimum effort to keep the saw blade cutting on the designated chalk line.

The invention also contemplates a saw blade unit in which the surface speed of the blade edge is maintained at an optimum speed, regardless of the density of the concrete or reinforcing bars through which it is cutting, by automatically controlling the speed of the motor propelling the platform on which the saw blade is supported.

It is therefore an object of this invention to provide a self-propelled saw blade which may be steered by varying the speed of the separate propelling wheels.

Another object of this invention is to provide such a self-propelled saw blade in which the longitudinal movement of the blade through concrete will vary, depending upon the density of the concrete encountered, with the rotational speed of the blade being maintained constant.

Another object of this invention is to provide such a machine in which the motors causing the saw blade to rotate and causing the platform supporting the saw blade to move are hydrualically driven.

These, together with other objects and advantages of the invention will become more readily apparent to those skilled in the art when the following general statements and descriptions are read in the light of the appended drawings.

DETAILED DESCRIPTION OF THE INVENTION

Figure 1:
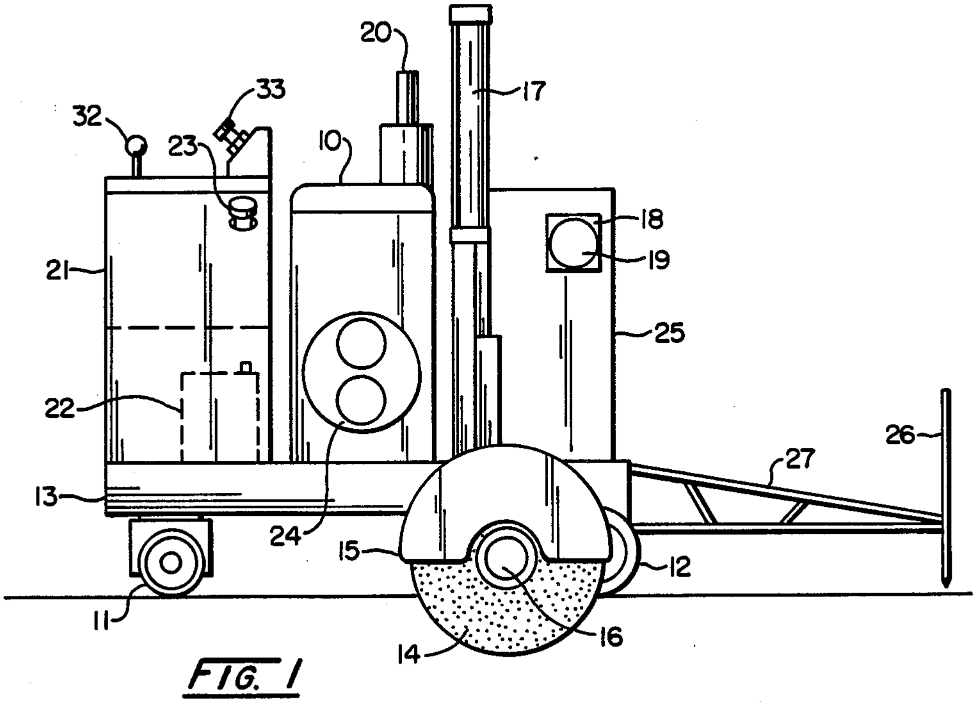
FIG. 1 is a side elevation view of the concrete saw embodying applicant's invention in which the operator walks behind the device.

Referring now more particularly to FIG. 1, applicant's invention comprises an engine in a housing 10 mounted on wheels 11 and 12, wheels 12 and 12*a* being the propulsion wheels. The entire unit is mounted on a platform 13 which also supports the blade 14 and blade housing 15, the blade 14 rotating on shaft 16. The blade may be raised or lowered and held in a raised or lowered position by means of hydraulic cylinder 17 which is operated by hydraulic pump 18 which in turn is driven by electric motor 19. The engine exhaust is shown at 20, the diesel fuel tank at 21 and the starting battery at 22. The fuel tank filler is shown at 23 and the hydraulic pump shown at 24 is directly geared to the prime engine located in housing 10, and is used to drive the hydraulic motor 34 which drives the saw blade 14.

The hydraulic fluid reservoir is shown at 25. A guide 26 positioned on an arm 27 is used by the operator to keep the saw aligned on the chalk line on the concrete being cut.

Figure 2:
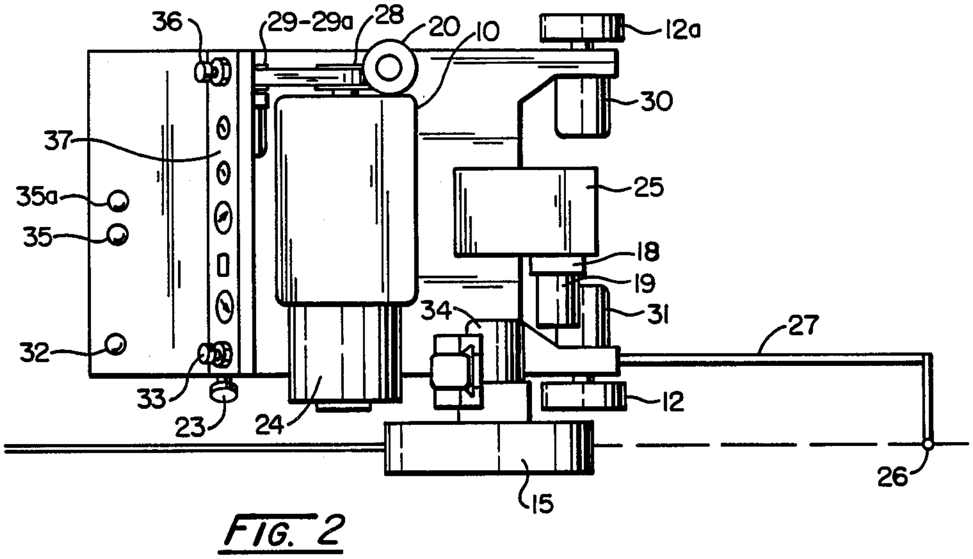
FIG. 2 is a plan view of the device shown in FIG. 1.

Referring now more particularly to FIG. 2, the belt 28 on the motor drive shaft is connected to the two pumps 29 and 29*a* which are used to drive the motors 30 and 31 which in turn propel the wheels 12 and 12*a*. The control for raising or lowering the cutting saw blade 14 is located at 32 and the control 33 is used to control the speed and direction of rotation of the hydraulic motor 34 by adjusting the position of the swash plate in hydraulic pump 24.

Control 35 is used to control the speed and direction of rotation of wheel 12 associated with motor 31 by adjusting the position of the swash plate in hydraulic pump 29. Control 35*a* is used to control the speed and direction of rotation of wheel 12*a* associated with motor 30 by adjusting the position of the swash plate in hydraulic pump 29*a*. Control 36 controls the speed of the prime mover located in housing 10 and appropriate oil pressure gauges and speed of rotation of the saw blade are shown on the instrument panel 37. The cutting saw unit shown in FIGS. 1 and 2 may be operated by the control system shown schematically in FIG. 3. The feedback characteristics of the control system shown in FIG. 3 may be omitted if desired.

Figure 3:
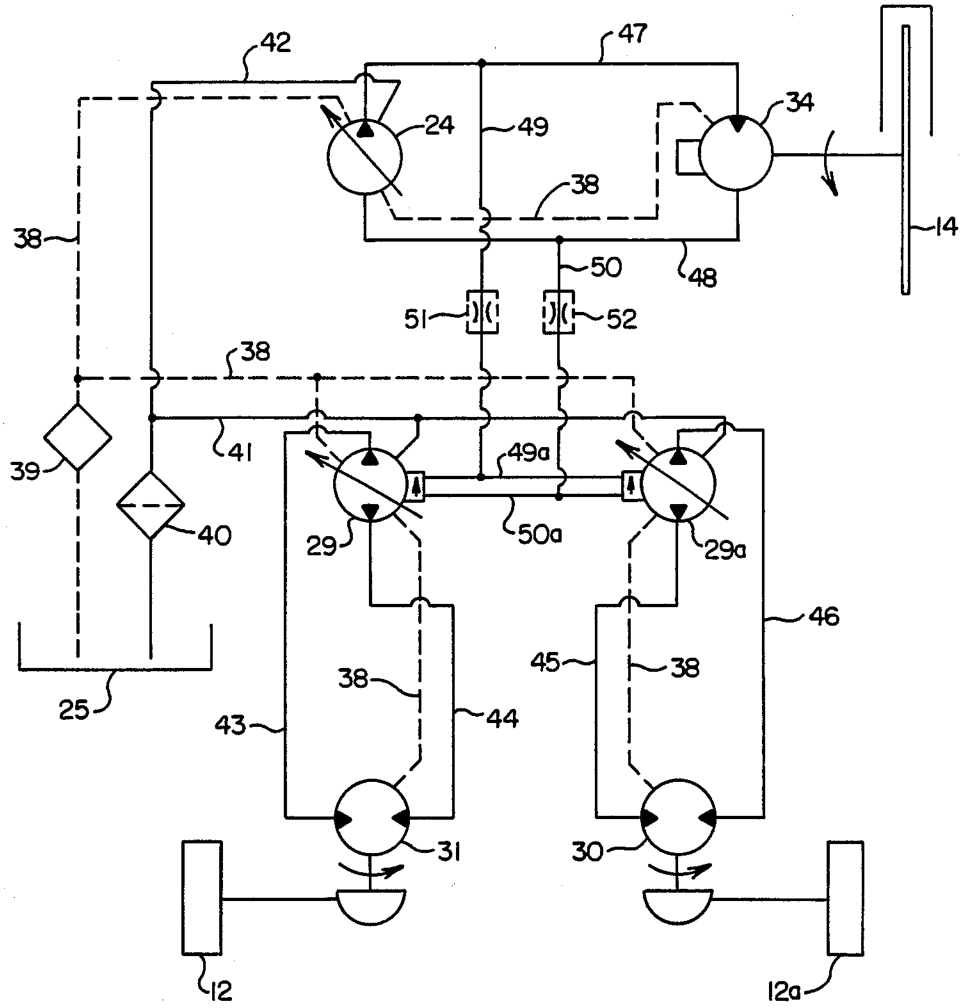
FIG. 3 is schematic drawing of the hydraulic control system used to control the propulsion and steering of applicant's invention as well as the cutting speed of the saw blade.

Referring now more particularly to FIG. 3, the saw blade 14 is driven by hydraulic motor 34 the speed and direction of which is controlled by hydraulic pump 24. The direction and rotation of the saw blade may be changed in order to maximize the life of the saw blade in addition to operating it at an optimum surface speed. Preferably the saw blade will be operated during its life approximately one-half the time in one direction and one-half the time in the opposite direction. Case drains 38—38 are shown which permit some of the hydraulic fluid to drain back through oil return filter 39 into the hydraulic reservoir 25. Makeup hydraulic fluid is drawn from reservoir 25 through suction filter 40 and by means of lines 41 and 42 is fed into pumps 29 and 29*a* and 24, respectively. Pump 29 is connected to motor 31 and pump 29*a* is connected to motor 30. Pump 29*a* is used to drive motor 30 which in turn causes rotation of wheel 12*a*. Pump 29 is used to drive motor 31 which in turn causes rotation of wheel 12. Pump 29 is connected to motor 31 through lines 43 nd 44, the line being used depends upon the direction of rotation desired for the wheel 12. Likewise, pump 29*a* is connected to motor 30 through lines 45 and 46, again the line being used depending upon the direction of rotation desired for the wheel 12*a*.

Pumps 29 and 29*a* as well as pump 24 are variable displacement hydraulic pumps which are bi-directional.

Motor 34 is connected to pump 24 through lines 47 and 48, the line being used depending upon the direction of rotation of the saw blade 14. Line 47 is also connected to line 49 which in turn is connected through orifice 51 and line 49*a* to the back of the swash platess of pumps 29 and 29*a* so that the swash plates in pumps 29 and 29*a* act as though they had been mechanically altered by the operator so as to vary the amount of hydraulic fluid pumped via lines 43 or 44 or lines 45 or 46 depending upon the density of the material being cut by the saw blade 14 and the consequent increased load on the motor 34 and the resulting pressure generated by pump 24. Likewise, line 48 is connected to line 50 and through orifice 52 to line 50*a* to the back of the swash plates of pumps 29 and 29*a* to accomplish the same objective if the saw blade 14 is rotating in the opposite direction. Orifices 52 and 53 are provided merely to reduce the flow of the fluid in the line.

In operation, the optimum rotational speed of the saw blade 14 is selected and manually adjusted by means of the position of the swash plate in hydraulic pump 24 which in turn drives motor 34 at the desired speed. The adjustment of the swash plate is controlled by the operator by control 33 and the speed of the sw blade in rpms is shown on the instrument panel 39. Once the saw blade 14 has been lowered into place in the concrete, it is held there by means of the hydraulic cylinder 17 which is operated by control 32 so that the saw blade will not tend to ride up in the cutting operation. In order to move the device forward, the operator moves the controls 35 and 35*a* thus tilting the swash plates in pumps 29 and 29*a* which in turn respectively through motors 31 and 30 operate wheels 12 and 12*a*. The operation can maintain the saw blade 14 on the chalk line on the concrete being cut by adjusting the relative speeds of motors 31 and 30 by means of the hydraulic controls 35 and 35*a*.

If the deivce is also equipped with a feedback system shown in FIG. 3, when the saw blade 14 encounters denser concrete or reinforcing bars which would tend to slow its rotational speed and increase its wear, a higher pressure would be produced by pump 24 in lines 47 or 48, depending upon the direction of rotation of the saw blade 14, which in turn would be transmitted either through lines 49 or 50, through the orifices 51 or 52 to pumps 29 and 29*a* causing pumps 29 and 29*a* to vary the amount of hydraulic fluid equally pumped by them to motors 31 and 30 through lines 43 or 44 or 45 or 46, again depending upon direction of travel, thus slowing the speed of rotation of propelling wheels 12 and 12*a* and thus the speed of the entire assembly thereby permitting saw blade 14 to maintain its optimal cutting speed. Likewise, if the saw blade 14 encounters less dense concrete so that it would tend to rotate at a higher speed, the same sequence of events will cause the motors 30 and 31 to speed up thus propelling the vehicle forward at a higher speed so that the speed of rotation of the saw blade 14 is maintained.

Thus it will be seen that by the use of applicant's invention the direction of cut of the concrete cutting blade 14 may be accurately controlled with a minimum of effort on the part of the operator by adjusting the speed of rotation of the separate propelling wheels 12 or 12*a*. Likewise, by the use of applicant's invention, if desired, the optimum cutting speed of the saw blade 14 may be maintained as the density of the concrete, macadem, or reinforcing bars encountered varies.

While this invention has been described in its preferred embodiment, it is to be appreciated that variations therefrom may be made without departing from the true scope and spirit of the invention.

I claim:

1. A self-propelled concrete cutting saw comprising a rotary saw blade, a first hydraulic motor rotating said saw blade, said saw blade being mounted on a platform movable along the plane of the concrete, said platform being supported by a first wheel and a second wheel, said first wheel and said second wheel being positioned in respective planes each of which is parallel to said rotary saw blade, a first hydraulic pump supplying hydrauic fluid to said first hydraulic motor, a second hydraulic motor rotating said first wheel, a third hydraulic motor rotating said second wheel, a second hydrauic pump supplying hydraulic fluid to said second hydraulic motor, third hydraulic pump suppying hydraulic fluid to said third hydraulic motor, and separte manual means asociated with each of said pumps to vary the discharge pressure and the direction of flow of hydraulic fluid from each of said pumps to the respective hydraulic motor to which it supplies hydraulic fluid.

2. The self-propelled concrete cutting saw of claim 1 wherein there is means connecting sid first hydraulic motor and said second hydraulic pump and said third hydraulic pump responsive to the hydraulic pressure in said first hydraulic motor for varying the pressure in said second hydraulic pump and said third hydraulic pump and thus varying the speed of rotation of said second hydraulic motor and said third hydraulic motor, depending upon the density of the concrete encountered by said rotating saw blade, thereby varying the speed to which said saw blade is propelled by the rotation of said first and second wheels, whereby the rotational speed of said saw blade is maintained within prescribed limits so as to minimize wear on said saw blade.

3. The self-propelled concrete cutting saw of claim 1 wherein said saw blade is a diamond-tipped saw blade.

4. The self-propelled concrete cutting saw of claim 2 wherein said hydraulic pumps are each provided with swash plates and control cylinders connected to each of said swash plates and wherein the output pressure from said first hydraulic pump is connected to the control cylinders of said second and third hydraulic pumps.

5. The self-propelled concrete cutting saw of claim 2 wherein said saw blade is a diamond-tipped saw blade.

6. The self-propelled concrete cutting saw of claim 2 wherein said prescribed limits are dictated by the density of the material being cut.

* * * * *